US010021616B2

(12) United States Patent
Oroskar et al.

(10) Patent No.: US 10,021,616 B2
(45) Date of Patent: Jul. 10, 2018

(54) TRAFFIC MANAGEMENT OF WIRELESS DEVICES ATTACHED TO A RELAY NODE

(71) Applicant: Sprint Spectrum LP, Overland Park, KS (US)

(72) Inventors: Siddharth Oroskar, Overland Park, KS (US); Jasinder Singh, Olathe, KS (US); Rajil Malhotra, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 171 days.

(21) Appl. No.: 15/017,822

(22) Filed: Feb. 8, 2016

(65) Prior Publication Data

US 2017/0230880 A1    Aug. 10, 2017

(51) Int. Cl.
*H04W 36/22*  (2009.01)
*H04L 12/26*  (2006.01)
(Continued)

(52) U.S. Cl.
CPC ............ *H04W 36/22* (2013.01); *H04L 43/16* (2013.01); *H04W 28/0289* (2013.01);
(Continued)

(58) Field of Classification Search
CPC . H04W 36/22; H04W 36/30; H04W 28/0289; H04W 76/046; H04W 76/27; H04L 43/16
See application file for complete search history.

(56) References Cited

U.S. PATENT DOCUMENTS 9,538,444 B2 *   1/2017  Kuwabara ............. H04W 36/22
2002/0160777 A1 *  10/2002  Takao .................... H04M 3/54
                                                   455/435.1
(Continued)

FOREIGN PATENT DOCUMENTS

EP    2 306 766 A1    4/2011
EP    2 725 849 A1    4/2014
WO    2013142361 A1   9/2013

OTHER PUBLICATIONS

Teyeb et al., Dynamic Relaying in 3GPP LTE-Advanced Networks, EURASIP Journal on Wireless Communications and Network, vol. 2009, Article IDS 731317, pp. 1-11, 2009.
(Continued)

*Primary Examiner* — Brian D Nguyen (57) ABSTRACT

Upon a determination that a relay backhaul link of a relay node is using excessive resources of a donor access node, wireless devices attached to the relay node are offloaded to other access nodes such as neighbor access nodes or to a different frequency band deployed by the donor access node or its neighbors. A donor access node transmits a congestion indicator to the relay node. The relay node transmits updated measurement parameters to end-user wireless devices connected thereto. An end-user wireless device reports back to the relay node in the event it measures a signal strength that is stronger than the current signal strength. This measurement event triggers a handoff of the end-user wireless device, thereby helping to alleviate the resource utilization of the air-interface of the donor access node.

17 Claims, 9 Drawing Sheets

(51) Int. Cl.
*H04W 36/00* (2009.01)
*H04W 28/02* (2009.01)
*H04W 36/30* (2009.01)
*H04W 76/04* (2009.01)
*H04W 76/27* (2018.01)

(52) U.S. Cl.
CPC ......... *H04W 36/30* (2013.01); *H04W 76/046* (2013.01); *H04W 76/27* (2018.02)

(56) References Cited

U.S. PATENT DOCUMENTS

| | | | | |
|---|---|---|---|---|
| 2002/0198000 | A1* | 12/2002 | Voyer | H04W 72/1252 |
| | | | | 455/452.1 |
| 2003/0068975 | A1* | 4/2003 | Qiao | H04W 88/04 |
| | | | | 455/11.1 |
| 2012/0063417 | A1* | 3/2012 | Redana | H04W 36/22 |
| | | | | 370/331 |
| 2012/0083275 | A1* | 4/2012 | Tajima | H04B 7/155 |
| | | | | 455/436 |
| 2013/0223227 | A1* | 8/2013 | Lee | H04B 7/15557 |
| | | | | 370/236 |
| 2015/0155930 | A1 | 6/2015 | Liu et al. | |

OTHER PUBLICATIONS

International Search Report for PCT/US2017/016638 dated May 12, 2017.

* cited by examiner

TRAFFIC MANAGEMENT OF WIRELESS DEVICES ATTACHED TO A RELAY NODE

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes, such as mini-macro access nodes (or "mini-macros") that function as a relay node for relaying communication from a macro base station or eNodeB, that functions as a donor access node, to an end-user wireless device. Relay nodes may be used at the edge of a coverage area of a donor access node to improve coverage and/or service, as well as in crowded areas having a high number of other wireless devices to increase the available throughput to the end-user wireless devices being relayed. However, relay nodes may be limited in their ability to effectively service end-user wireless devices that are attached to it, particularly if the throughput of the backhaul connection from the donor access node is limited.

OVERVIEW

Exemplary embodiments described herein include systems, methods, and processing nodes for performing traffic management of wireless devices attached to relay nodes. A method for traffic management includes determining that a wireless backhaul connection between a donor access node and a relay access node for relaying services between the donor access node and one or more end-user wireless devices is causing congestion in an air interface of the donor access node, and transmitting an indicator of congestion to the relay access node. In response to receiving the indicator of congestion, the relay access node offloads said one or more end-user wireless devices to a neighbor access node.

A system for traffic management includes a donor access node for providing network services to an end-user wireless device, wherein the end-user wireless device is in wireless communication with a small access node coupled to a relay wireless device for relaying the network services between the donor access node and the end-user wireless device, and a processor communicatively coupled to the donor access node. The processor enables the donor access node to execute operations including identifying a presence of the relay wireless device, determining that a resource utilization of the relay wireless device exceeds a threshold, and transmitting an indicator to the relay wireless device. Upon receiving the indicator, the relay wireless device instructs the small access node to trigger a handover of the end-user wireless device.

A relay node for traffic management performs operations including receiving an indication of congestion from a donor access node, wherein the indication of congestion is based on a first resource usage of the donor access node meeting a first threshold. In response to the indication, the relay node generates a measurement event for triggering a handover of an end-user wireless device communicatively coupled to the relay node, and transmits the measurement event in a message to the end-user wireless device. Upon receiving a measurement of a neighbor node that exceeds a handover threshold, the relay node executes the handover of the end-user wireless device to the neighbor node.

DETAILED DESCRIPTION

In embodiments disclosed herein, upon a determination that a relay backhaul link of a relay node is using excessive resources of a donor access node, wireless devices attached to the relay node are offloaded to other access nodes such as neighbor access nodes or to a different frequency band deployed by the donor access node or its neighbors. An air interface of the donor access node may be congested or, in other words, a usage of the air interface may reach a predefined configurable threshold. Upon determining this, the donor access node determines whether there are any relay nodes being served, and how much the usage of the relay node is contributing to the congestion. Since relay nodes can have several end-user wireless devices attached thereto, a backhaul link of the relay node, i.e. the wireless link between a transceiver of the relay node and the donor access node, may be utilizing large amounts of resources of the donor access node. The resource utilization of the backhaul link can be compared with a threshold. If the utilization is excessive or if it exceeds the threshold, the donor access node can transmit a congestion indicator to the relay node. The congestion indicator may be transmitted within a directed message, or may be included as part of a radio resource connection (RRC) reconfiguration message.

Upon receiving the congestion indicator, the relay node determines that its backhaul link is either congested or causing congestion in the air interface of the donor access node. Since either type of congestion may cause a reduction in quality of service to end-user wireless devices connected therein, the relay node may determine that offloading one or more end-user wireless devices is necessary. The relay node includes an access node module with a transceiver-antenna combination that communicates with the end-user wireless devices connected thereto. The relay node can use this communication means to transmit updated measurement parameters to the end-user wireless devices. The updated measurement parameters include threshold levels for reporting measurements of reference signals transmitted by neighboring access nodes, or reference signals of a frequency band different from the frequency band currently being deployed by the relay node. In other words, based on the updated measurement parameters, the end-user wireless device reports back to the relay node in the event it measures a signal strength that is stronger than the current signal strength. This measurement event triggers a handoff of the end-user wireless device from the access node or cell it is currently attached to, i.e. the relay node, to the access node with the stronger signal/frequency band, i.e. the target access node. The target access node can be the donor access node, or any neighbor thereof. Such a movement of one or more end-user wireless devices from the serving cell to another access node or frequency band helps to alleviate the resource utilization of the relay backhaul and, consequently, the air-interface of the donor access node. Moreover, such offloading is particularly beneficial in situations where more than one relay access node is coupled to a single relay wireless device. These and additional operations are further described with respect to the embodiments depicted in FIGS. 1-9 below.

Figure 1:
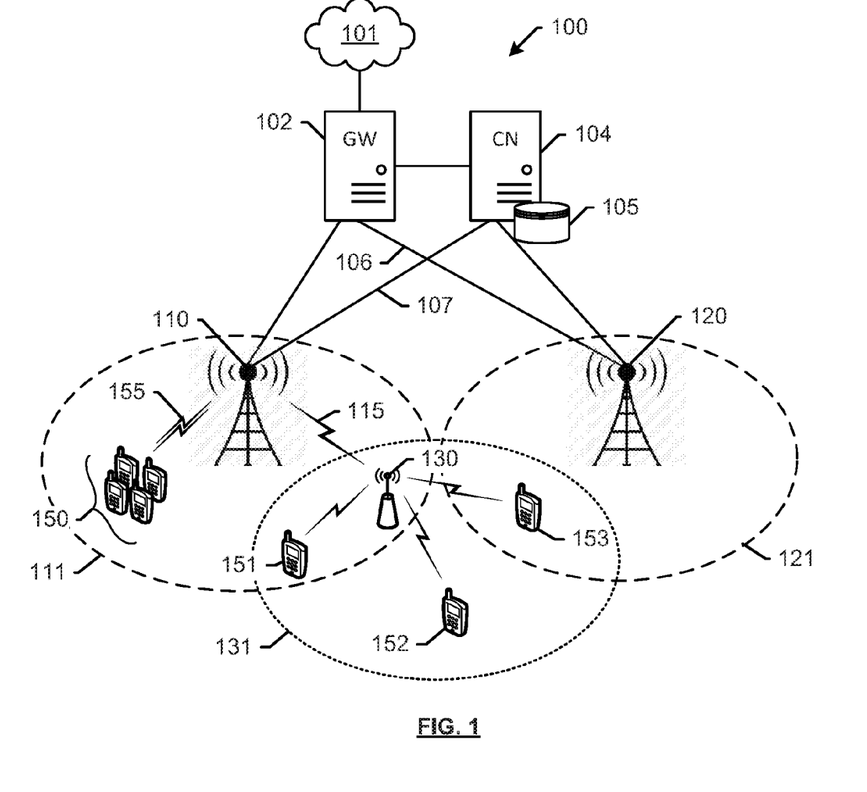
FIG. 1 depicts an exemplary system for traffic management of wireless devices attached to a relay node.

FIG. 1 depicts an exemplary system 100 for donor selection. System 100 comprises a communication network 101, gateway 102, controller node 104, access nodes 110 and 120, relay node 130, and end-user wireless devices 150, 151, 152, 153. Access node 110 is illustrated as having coverage area 111, and access node 120 is illustrated as having coverage area 121. Relay node 130 is located within coverage area 111, and is illustrated as having its own coverage area 131. Relay node 130 acts as a wireless access point for end-user wireless devices 151, 152, and 153, relaying services to said end-user wireless devices from access node 110 via air interface 115, also referred to herein as a relay backhaul air interface, or simply "backhaul". Consequently, access node 110 may be referred to as a donor access node. Further, end-user wireless devices 150 are located within coverage area 111 and access network services directly from access node 110 via air interface(s) 155. End-user wireless device 151 is located within coverage areas 111 and 131 and accesses network services from relay node 130, perhaps in order to alleviate a load on air interface 155. End-user wireless device 152 is located outside coverage areas 111 and 121 and within coverage area 131 and, thus, is able to access network services from donor access node 110 relayed via relay node 130. End-user wireless device 153 is located within coverage areas 121 and 131 and is able to access network services from either relay node 130 or from neighbor access node 120.

In operation, donor access node 110 may monitor usage of its air interface (comprised by any combination of at least links 155 and 115 among others), and may determine that the air interface is congested. For instance, a usage of the air interface may reach a predefined configurable threshold. Usage may be determined using a physical resource block (PRB) utilization, amount of signaling, utilization or signaling per unit of time over a configurable timeframe, or any metric that may be evident to persons having ordinary skill in the art in light of this disclosure. Upon determining that the usage or utilization exceeds the threshold, donor access node 110 determines whether there are any relay nodes being served by its air interface. This may be performed based on a separate public land mobile network (PLMN) identifier assigned to relay node 130. Alternatively or in addition, a separate quality of service (QoS) class identifier, or QCI, may be assigned to relay node 130, thereby enabling identification of relay node 130. Further, access node 110 may determine that backhaul link 115 of relay node 130 is contributing heavily to the congestion, perhaps by using excessive resources of donor access node 110. This may be determined using a physical resource block (PRB) utilization. For example, a metric may be defined of PRB utilization per QCI to determine the contribution of link 115 to the congestion. The resource utilization of backhaul link 115 can be compared with a threshold. If the utilization is excessive or if it exceeds the threshold, donor access node 110 may determine that it is necessary to offload one or more of wireless devices 151, 152, 153 attached to relay node 130 to other access nodes such as neighbor access node 120 or to a different frequency band deployed by donor access node 155.

To initiate this operation, donor access node 110 can transmit a congestion indicator to relay node 130. The congestion indicator may be transmitted within a directed message such as a congestion indicator message that is specifically constructed for the purposes of indicating congestion and transmitted via existing channels between donor access node 110 and relay node 130. Such a message may contain a specific bit intended to convey a congestion status. The indicator may alternatively be included as part of a RRC reconfiguration message. The RRC reconfiguration message may include a specific bit that is interpreted by relay node 130 as a congestion indicator. Multiple bits may be used to signify different levels of congestion, and parsed by relay node 130 to determine the different levels of congestion and to correspondingly offload different end-user devices.

Upon receiving the congestion indicator, whether in a congestion indication message or as part of a RRC reconfiguration message, relay node 130 parses the congestion indicator to determine that backhaul link 115 is either congested or causing congestion in the air interface of donor access node 110. Since either type of congestion may cause a reduction in quality of service to end-user wireless devices 140, 151, 152, and 153, by virtue of all said devices receiving services from donor access node 110, relay node 130 may offload one or more end-user wireless devices 151, 152, or 153 connected thereto. To achieve this, relay node 130 transmits updated measurement parameters to end-user wireless devices 151, 152, and 153. The updated measurement parameters may include A4 measurement parameters, indicating threshold signal levels and hysteresis levels for reporting measurements of other reference signals. The other reference signals may be transmitted, for instance, by neighboring access node 120, or by a frequency band deployed by donor access node 110 that is different from the frequency band of backhaul link 115. Based on the updated measurement parameters, end-user wireless devices 151, 152, and 153 monitor these other signal levels. The measurement may be, for instance, of a reference signal broadcast or otherwise transmitted from either of relay nodes 110, 120 and measured at one or more of end-user wireless devices 151, 152, 153. The measurement can include a reference signal receive power (RSRP), signal-to-noise ratio (SNR), signal-to-interference noise radio (SINR), etc. If an A4 event is triggered, end-user wireless devices 151, 152, 153 transmit the measurements to relay node 130 for a handover determination. For example, the transmitted measurement can also include an identifier of the access node generating the measured reference signal. The identifier can include a unique physical cell identifier (PCI) of the access node, or of a specific cell deployed by the access node. For instance, depending on the type of node, an access node can deploy more than one cell, each of which has a unique PCI. Therefore, relay node 130 is able to determine an identity of the access node generating the measured reference signal using the PCI. Based on the identifier, Relay node 130 may determine whether or not to execute the handover. If relay node 130 determines that a handover is necessary, one or more of end-user wireless devices 151, 152, and 153 may be offloaded to neighbor access node 120 or to the different frequency band served by donor access node 110.

In an embodiment, system 100 comprises a long-term-evolution (LTE) system that deploys frequency bands in three different band classes: band class B25 using frequency division duplexing (FDD) and comprising frequencies around 1.9 GHz, band class B26 using FDD and comprising frequencies around 850 Mhz, and band class B41 time-division duplexing (TDD) and comprising frequencies around 2.5 Ghz. For example, access nodes 110 and 120 may deploy one or more band classes from among B25, B26, and B41, while relay node 130 may deploy a single frequency band within band class B41. In order to trigger offloading of end-user devices 151, 152, 153 attached thereto, relay node 130 can transmit updated A4 measurement parameters to end-user wireless devices 151, 152, 153, such that the end-user wireless devices monitor measurements of signals from either of bands B25 or B26 deployed by one or both of donor access node 110 or neighbor access node 120. The monitoring may be performed using appropriate transceivers within each end-user wireless device 151, 152, 153. If the measurements determine that the B25/B26 signals are a threshold amount above the B41 signal, then a handover is triggered. Pushing these devices to other frequency bands or band classes deployed by other access nodes can help alleviate resource utilization of air interface 115, thereby reducing congestion of the overall air interface.

In an embodiment, relay node 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted respectively by relay node 130 to wireless devices 151, 152, 153. Likewise, RF signals received from wireless devices 151, 152, 153 are amplified and transmitted by relay node 130 respectively to donor access node 110. Alternatively or in addition, a layer 2 relay device performs a decode and forward (DF) function. RF signals received from donor access node 110 are demodulated and decoded, then encoded and modulated again before being transmitted by relay node 130 to wireless devices 151, 152, 153. Likewise, RF signals received from wireless devices 151, 152, 153 are demodulated and decoded, then encoded and modulated again before being transmitted by relay node 130 to donor access node 110. Alternatively or in addition, a layer 3 relay device also performs a decode and forward function. However, a layer 3 relay device also performs additional processing (such as ciphering and/or data concatenation/segmentation/resassembly). In other words, relay node 130 performs demodulation and decoding of the received RF signals (either uplink or downlink), processes received data, then encodes, modulates, and transmits the data to wireless devices 151, 152, 153.

Wireless devices 150, 151, 152, 153 may be any device, system, combination of devices, or other such communication platform capable of communicating wirelessly with relay node 130 or access nodes 110, 120 using one or more frequency bands deployed therefrom. Wireless devices 150, 151, 152, 153 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120 or relay node 130. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150, 151, 152, 153, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 and relay node 130 can be any network node configured to provide communication between wireless devices 150, 151, 152, 153 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 111, 121 in the range of approximately five kilometers to thirty five kilometers and an output power in the tens of watts. Relay node 130 can be a small access node including a microcell access node, a picocell access node, a femtocell access node, or the like such as a home NodeB or a home eNodeB device. Moreover, it is noted that while access nodes 110, 120 and relay node 130 are illustrated in FIG. 1, any number of access nodes and relay nodes can be implemented within system 100.

Access nodes 110, 120 and relay node 130 can comprise a processor and associated circuitry to execute or direct the execution of computer-readable instructions to obtain information as further described with reference to FIGS. 2-4. Briefly, access nodes 110, 120 and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. See, for example, FIGS. 2-4 describing components of donor access nodes and relay nodes. Further, access nodes 110, 120 and relay node 130 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101

Figure 2:
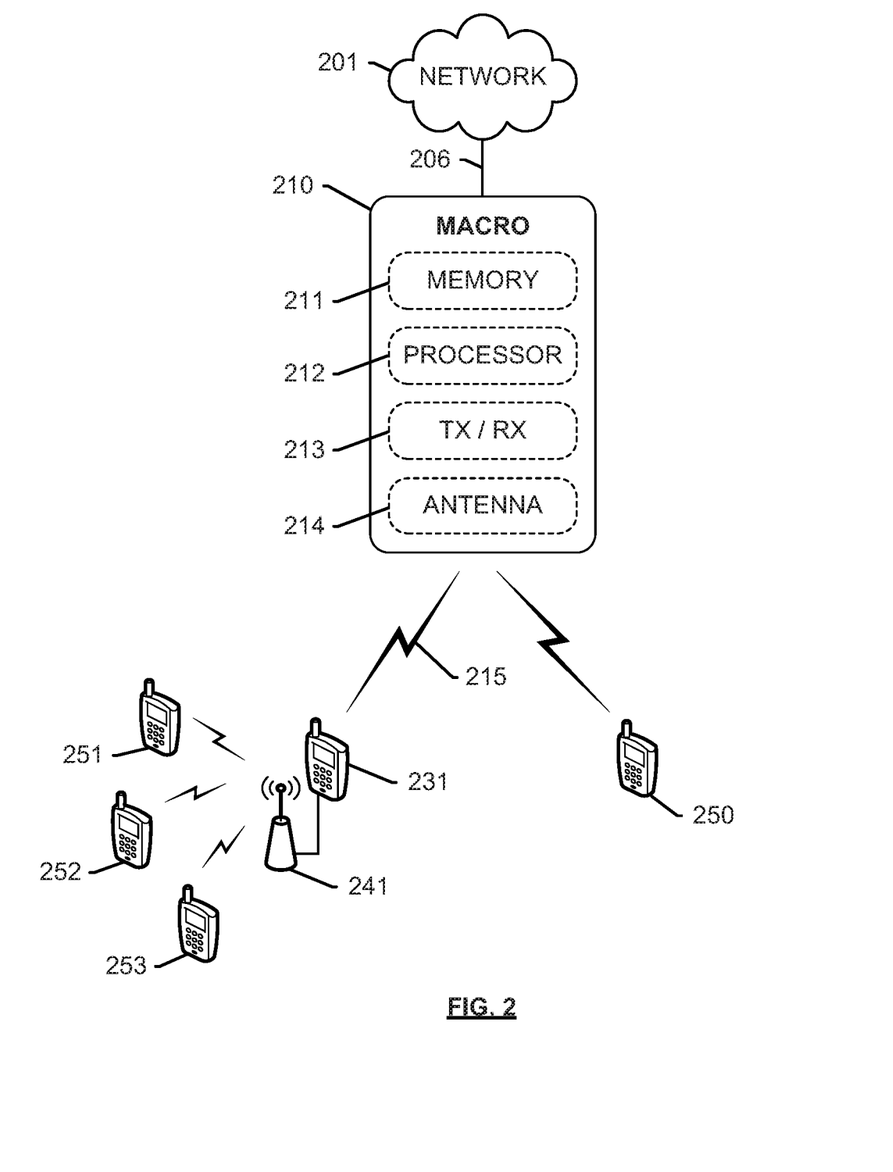
FIG. 2 depicts an exemplary donor access node for traffic management of wireless devices attached to relay node.

FIG. 2 depicts an exemplary donor access node 210 for traffic management of wireless devices attached to a relay node. Donor access node 210 may be a macro-cell access node as described above, or simply "macro". Macro 210 is configured as an access point for providing network services from network 201 directly to end-user wireless device 250 and relayed via relay node 230 to end-user wireless devices 251, 252, 253. Macro 210 is illustrated as comprising a memory 210 for storing logical modules that perform traffic management operations described herein, a processor 212 for executing the logical modules, a transceiver 213, and an antenna 214 for communication with wireless device 250 and relay node 230. Further, macro 210 is communicatively coupled to network 201 via communication interface 206, which may be any wired or wireless link as described above. Although only one transceiver and antenna combination is depicted in macro 210, additional transceivers and antennas may be incorporated in order to deploy multiple frequency bands and to facilitate communication across other network nodes that are not shown, such as gateways, controllers, and other access nodes. In operations described herein, macro 210 monitors backhaul link 215 to determine whether or not it is contributing to congestion in an air interface of macro 210, and triggering traffic management operations.

Figure 3:
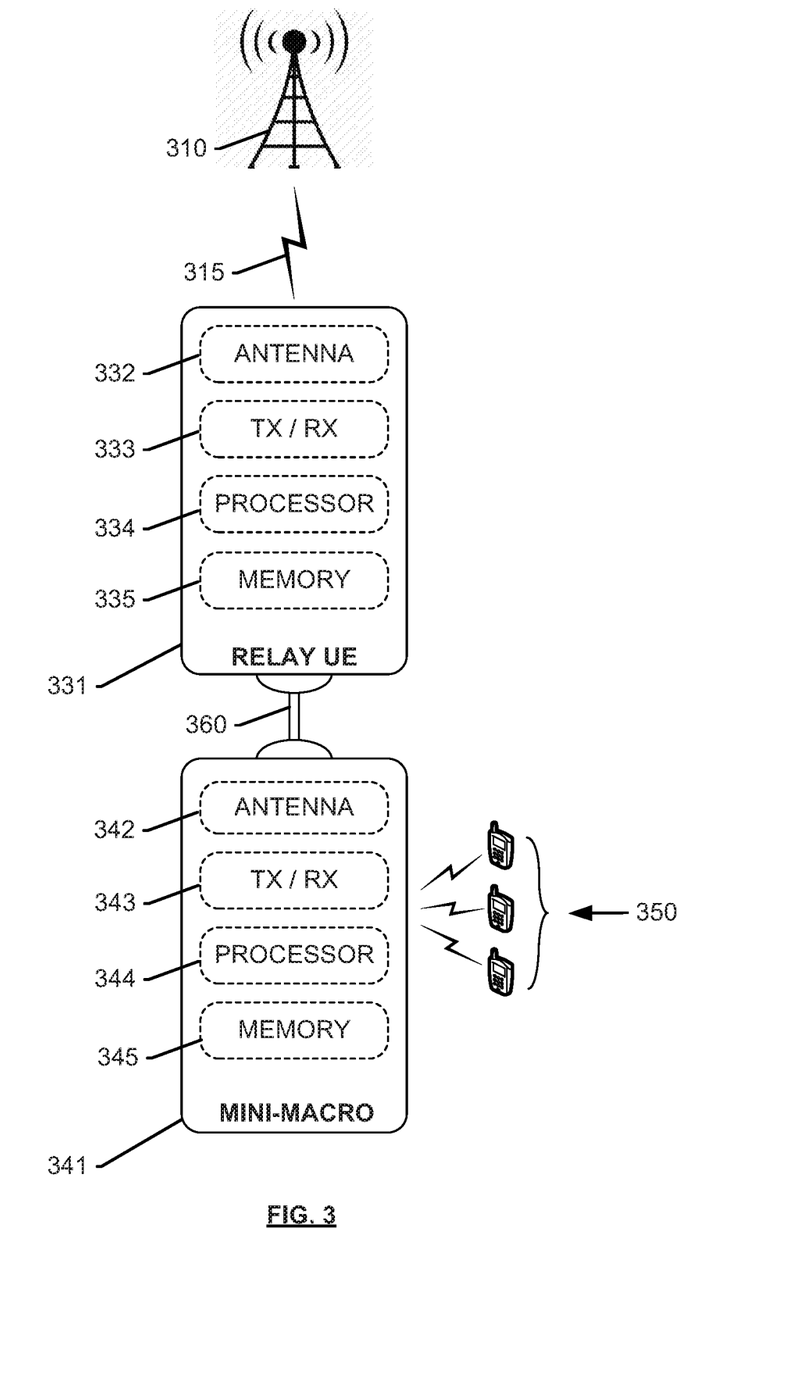
FIG. 3 depicts an exemplary relay node comprising a separate relay wireless device and mini-macro access node.
Figure 4:
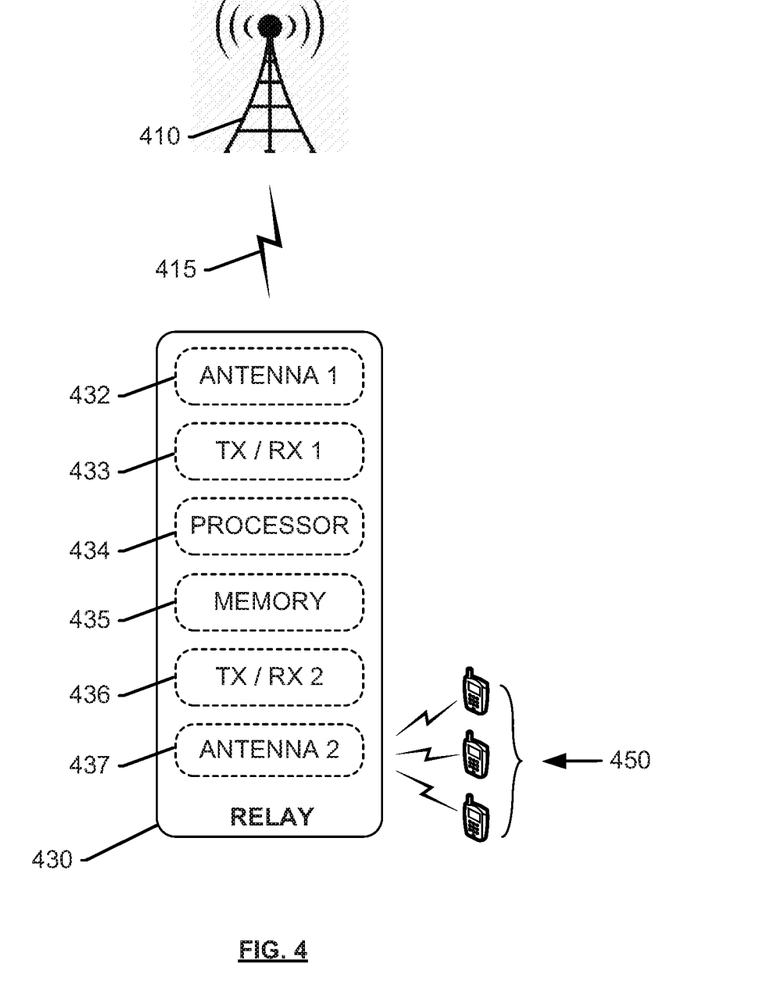
FIG. 4 depicts an exemplary relay node comprising a combined wireless device and mini-macro access node.

FIGS. 3 and 4 depict alternate configurations of a relay node. For example, FIG. 3 depicts an exemplary relay node comprising a separate relay wireless device (UE) 331 and a mini-macro access node 341. Relay wireless device 331 provides a communication path between relay access node 341 and donor access node 310 via relay backhaul 315. Relay wireless device 331 is illustrated as comprising an antenna 332 for direct (i.e. unrelayed) communication with access node 310 via communication link 315, a transceiver 333, a processor 334, and a memory 335 for storing logical modules that are executed by processor 334 to perform operations further described herein. Further, relay wireless device 331 is coupled to mini-macro access node 341 via a communication interface 360. Communication interface 360 may be any interface that enables direct communication between relay wireless device 331 and mini-macro 341, such as USB, FireWire, Ethernet, or any other serial, parallel, analog, or digital interface. Mini-macro 341 is illustrated as comprising an antenna 342 for wireless communication with end wireless devices 350, a transceiver 343, a processor 344, and a memory 345 for storing logical modules for performing traffic management operations described herein. Although only one transceiver is depicted in each of relay wireless device 331 and mini-macro 341, additional transceivers may be incorporated in order to facilitate communication across interface 360 and other network elements.

In an alternate embodiment, FIG. 4 depicts an exemplary relay node 430 comprising a combined relay node and a mini-macro access node. Relay node 430 is illustrated as comprising a first antenna 432 for direct communication with donor access node 410 via communication link 415, a first transceiver 433, a processor 434, a memory 435 for storing logical modules for enabling relay node 430 to perform traffic management modules described herein, a second transceiver 436, and a second antenna 437 for wireless communication with end-user wireless devices 450. Although only two transceivers are depicted in relay access node 430, additional transceivers may be incorporated in order to facilitate communication with other network elements.

Figure 5:
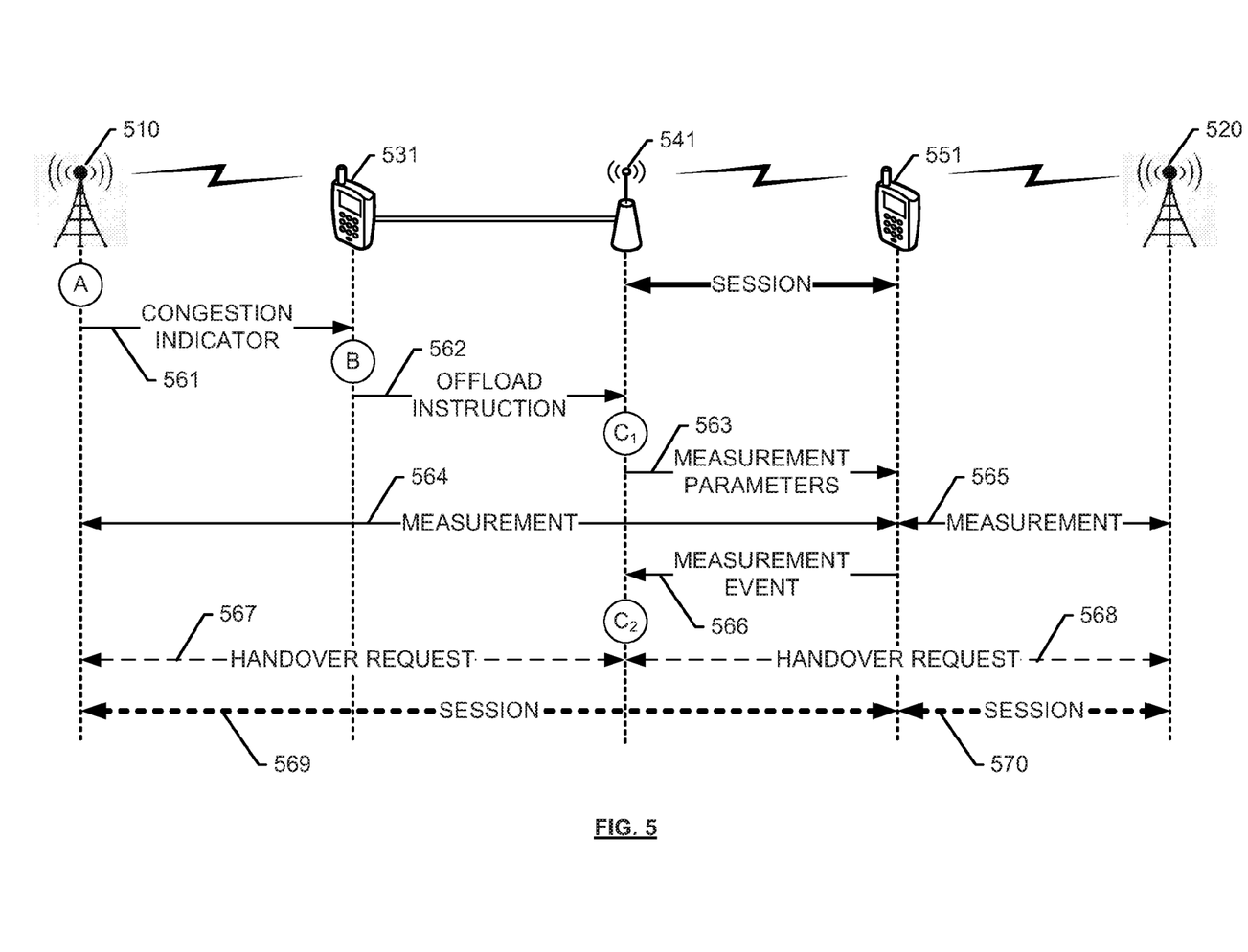
FIG. 5 depicts an exemplary network flow diagram for traffic management of wireless devices attached to a relay node.

FIG. 5 depicts an exemplary network flow diagram for traffic management of wireless devices attached to a relay node. The network flow is illustrated with respect to a donor access node 510, relay wireless device 531 coupled to a mini-macro access node 541, end-user wireless device 551 that is engaged in a data session 560 with mini-macro 541, and a neighbor access node 520. The combination for relay wireless device 531 and mini-macro 541 may be referred to as a relay node, and is configured to relay data between donor access node 510 and end-user wireless device 551. In other embodiments, the flow can be implemented with any suitable network element. Although FIG. 4 (and FIGS. 5-8 referred therefrom) depict steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Figure 6:
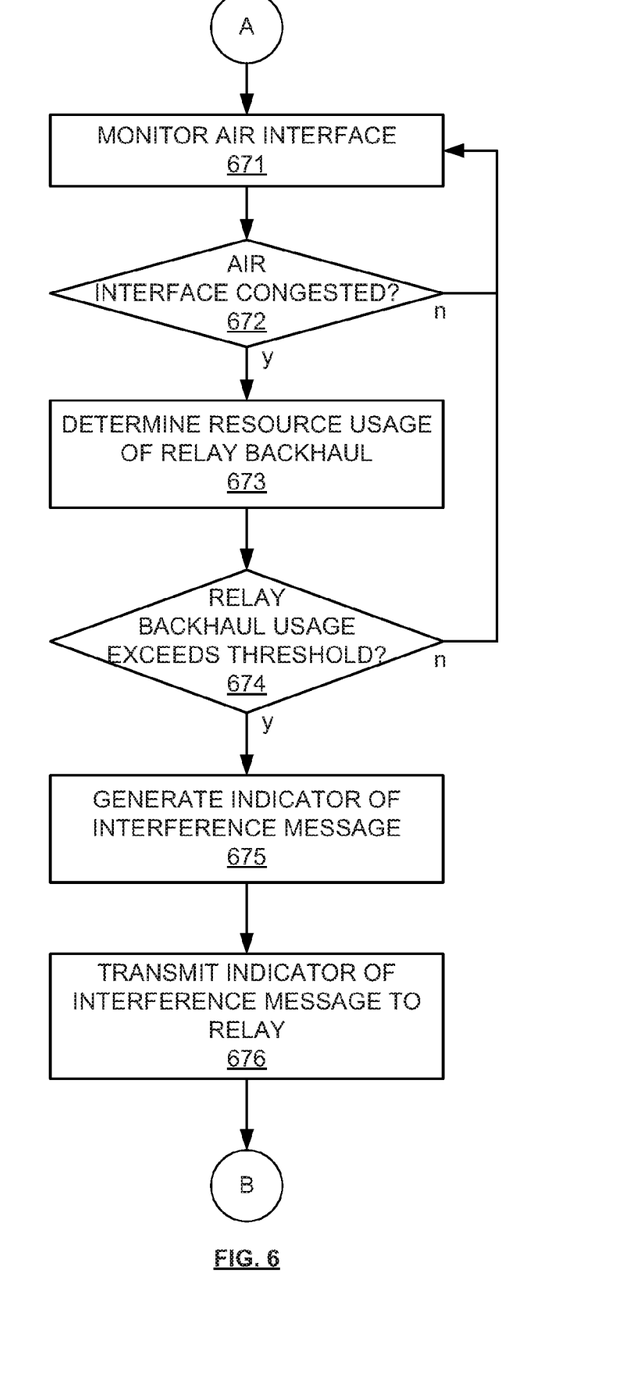
FIG. 6 depicts an exemplary method for traffic management at a donor access node.

In operation, donor access node 510 may perform method A, that is further described with reference to FIG. 6. Referring to FIG. 6, in 671, the donor access node monitors usage of its air interface, and in 672, may determine whether or not the air interface is congested. This may be determined using a physical resource block (PRB) utilization, or any other known metric. For instance, a usage of the air interface may reach a predefined configurable threshold. If the air interface is not congested, the donor access node continues monitoring 671. If the air interface is determined to be congested, in 673, the donor access node determines whether there are any relay nodes being served by its air interface, and whether or not the backhaul link of the relay node is contributing heavily to the congestion in 674. This may be determined using a physical resource block (PRB) utilization. If the utilization does not exceed the threshold, the method may continue monitoring the air interface, or perform other operations. If the utilization is determined to be excessive or if it exceeds the threshold in 674, the donor access node may determine that it is necessary to offload one or more wireless devices attached to the relay node. To initiate this operation, in 676, the donor access node transmits a congestion indicator to the relay node. The congestion indicator may be transmitted within a directed message such as a congestion indicator message that is specifically constructed for the purposes of indicating congestion and transmitted via existing channels. Such a message may contain a specific bit intended to convey a congestion status. The indicator may alternatively be included as part of a RRC reconfiguration message. Either the congestion indicator message or the RRC reconfiguration message may include a specific bit that is intended to convey or indicate congestion, or an instruction to offload end-user wireless devices. Multiple bits may be used to signify different levels of congestion, and parsed by the relay node to determine the different levels of congestion and to correspondingly offload different end-user devices.

Figure 7:
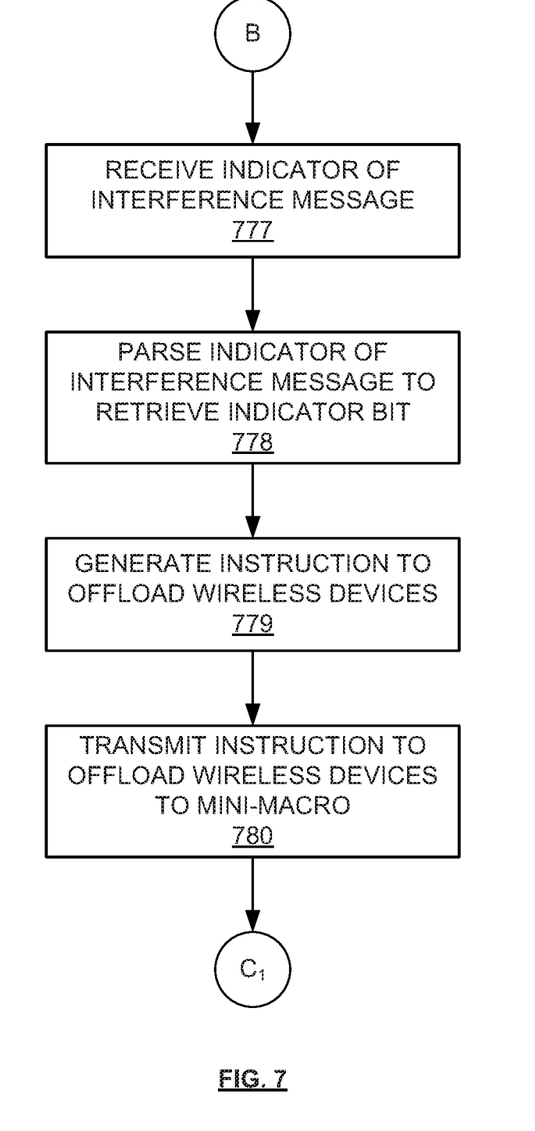
FIG. 7 depicts an exemplary method for traffic management at a relay wireless device.

Referring back to FIG. 5, at 561, the congestion indicator is transmitted to relay wireless device 531. Upon receiving the congestion indicator, whether in a congestion indication message or as part of a RRC reconfiguration message, relay wireless device 531 performs operations B, further described with reference to FIG. 7. Referring now to FIG. 7, at 777, the relay wireless device receives the congestion indicator message and, at 778, parses the congestion indicator to determine that its backhaul link is either congested or causing congestion in the air interface of the donor access node. In response to determining the presence of congestion, the relay wireless device may determine at 779 that a command to offload end-user wireless devices must be generated and transmitted to the mini-macro connected thereto in 780.

Figure 8:
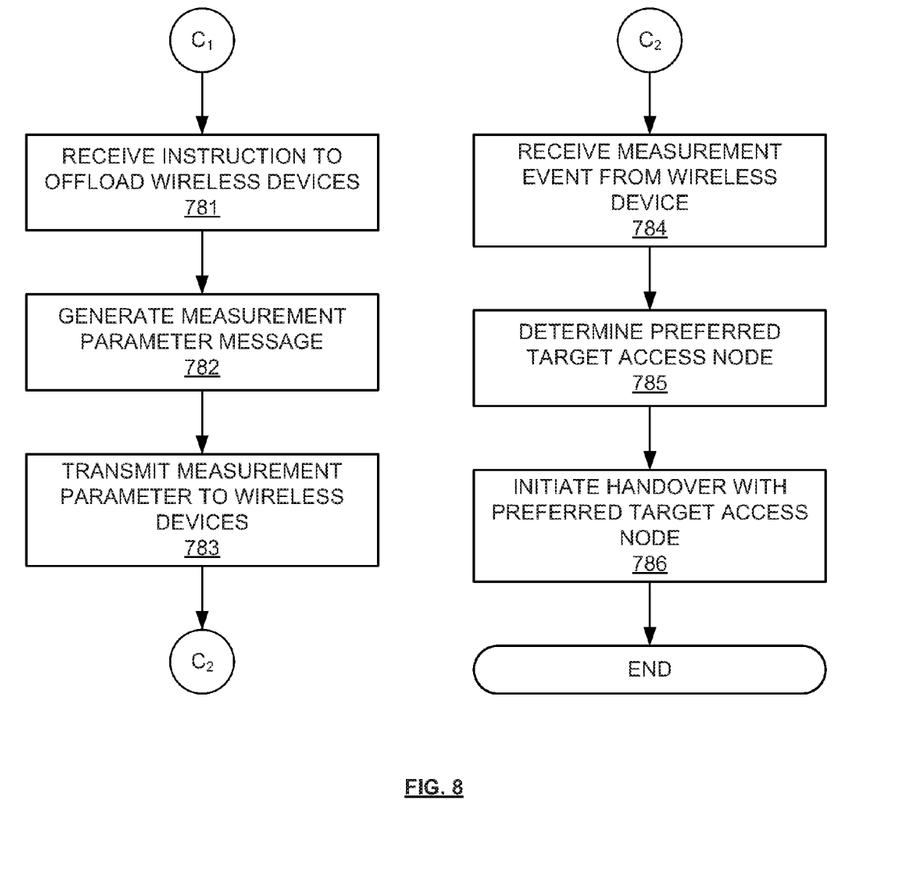
FIG. 8 depicts an exemplary method for traffic management at a mini-macro access node.

Referring back to FIG. 5, mini-macro 541 receives the command 562 to offload end-user wireless devices attached thereto (such as end-user wireless device 551), and performs method $C_1$, which is further described in FIG. 8. Referring now to FIG. 8, at 781, the mini-macro receives the instruction to offload wireless devices, and generates a parameter adjustment message in 782. The parameter adjustment message may contain updated measurement parameters to be transmitted in 783 to end-user wireless devices. For instance, the updated measurement parameters may include A4 measurement parameters, indicating threshold signal levels and hysteresis levels for reporting measurements of other reference signals transmitted by access nodes other than the mini-macro itself. In some embodiments, the updated measurement parameters transmitted in 783 may include an RRC reconfiguration message.

Referring back to FIG. 5, the updated measurement parameters 563 are received at end-user wireless device 551. Generally, end-user wireless device 551 performs periodic measurements 564 and 565 of reference signal levels from access nodes 510 and 520, respectively. The measurement can include a reference signal receive power (RSRP), signal-to-noise ratio (SNR), signal-to-interference noise radio (SINR), etc. Based on the updated measurement parameters 563, an event may be triggered such as an A4 event, which indicates that the signal levels of measurements 564 and/or 565 are higher than the signal level of session 560 by a threshold amount. The threshold amount can be one of the updated measurement parameters. Thus, in case the event is triggered, end-user wireless device 551 transmits one or more of measurements 564 and 565 measurements to mini-macro 540 for a handover determination. Based on the measurement event 566, mini-macro 541 performs method $C_2$ to determine whether or not to execute the handover. This method is further described in FIG. 8.

With reference now to FIG. 8, at 784, the mini-macro receives the measurement event from the end-user wireless device. Based on the measurement event(s), at 785, the mini-macro determines a preferred target access node to which the end-user wireless device shall be offloaded. The selection of the preferred target access node may be one with the highest signal level, or may be based on other factors pre-programmed into the mini-macro, or indicated in a preference from the end-user wireless device. Upon determining the preferred target access node, which may be any one of a neighbor access node or a different frequency band served by the donor access node, the handover is initiated in 786. For instance, referring back to FIG. 5, mini-macro 541 may initiate one or both of handovers 567 or 568. Handover requests 567, 568 are standard operations with acknowledgements provided by one or both of access nodes 510, 520, resulting in a session 569 or 570 being setup with end-user wireless device 551 and one or more of access nodes 510, 520.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, relay node 130, wireless device 531, mini-macro 541, and/or network 101.

Figure 9:
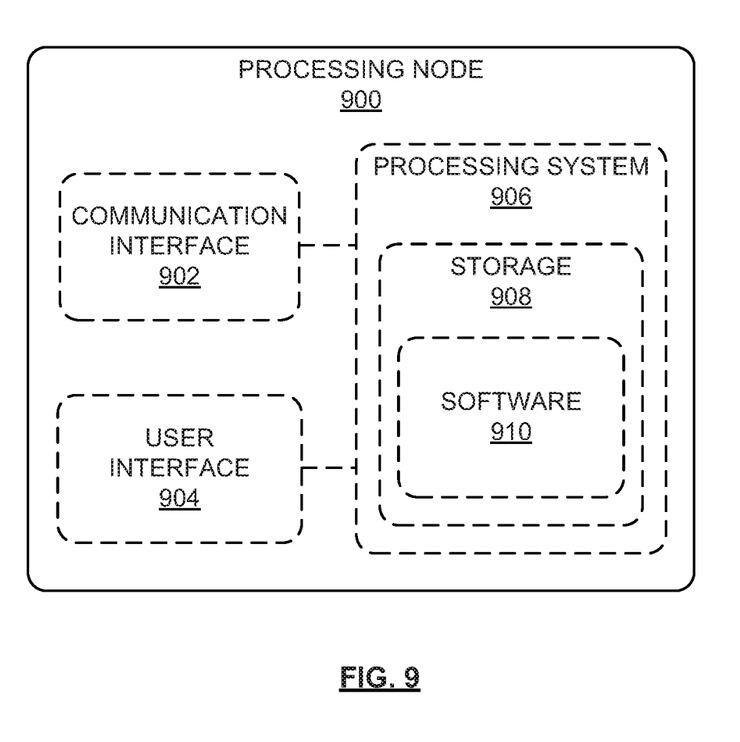
FIG. 9 depicts an exemplary processing node.

FIG. 9 depicts an exemplary processing node 900 comprising communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. For example, storage 908 may include a buffer. Software 910 may include computer programs, firmware, or some other form of machine-readable instructions, including an operating system, utilities, drivers, network interfaces, applications, or some other type of software. For example, software 910 may include a scheduling module. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for traffic management in a wireless network, the method comprising:
    determining that a wireless backhaul connection between a donor access node and a relay access node for relaying services between the donor access node and one or more end-user wireless devices is causing congestion in an air interface of the donor access node; and
    transmitting, within a radio resource control (RRC) message, an indicator of congestion to the relay access node, wherein the indicator of congestion comprises a dedicated bit in the RRC message;
    wherein in response to receiving the indicator of congestion, the relay access node offloads said one or more end-user wireless devices to a neighbor access node.

2. The method of claim 1, wherein determining that the wireless backhaul connection is causing congestion in the air interface further comprises determining that a usage of the air interface exceeds a first threshold.

3. The method of claim 2, wherein the usage of the air interface is based on a physical resource block (PRB) utilization of the donor access node.

4. The method of claim 2, wherein determining that the wireless backhaul connection is causing congestion in the air interface further comprises determining that the usage of the air interface by the wireless backhaul connection exceeds a second threshold.

5. A system for traffic management in a wireless network, the system comprising:
    a donor access node for providing network services to an end-user wireless device, wherein the end-user wireless device is in wireless communication with a small access node coupled to a relay wireless device for relaying the network services between the donor access node and the end-user wireless device; and
    a processor communicatively coupled to the donor access node, the processor for configuring the donor access node to execute operations comprising:
    identifying a presence of the relay wireless device;
    determining that a resource utilization of the relay wireless device exceeds a threshold; and
    transmitting, within a radio resource control (RRC) message, an indicator to the relay wireless device, wherein the indicator of congestion comprises a dedicated bit in the RRC message;
    wherein upon receiving the indicator, the relay wireless device instructs the small access node to trigger a handover of the end-user wireless device.

6. The system of claim 5, wherein identifying the presence of the relay wireless device is based on a first public land mobile network (PLMN) identifier of the relay wireless device.

7. The system of claim 6, wherein the first PLMN identifier is different from a second PLMN identifier associated with each of the small access node and the end-user wireless device.

8. The system of claim 5, wherein identifying the presence of the relay wireless device is triggered by a determination that an air interface of the donor access node is congested.

9. The system of claim 5, wherein the small access node triggers the handover by requesting a report of a measurement event from the end-user wireless device.

10. The system of claim 9, wherein the measurement event includes a determination at the end-user wireless device that a neighboring access node has a stronger signal than the small access node.

11. The system of claim 10, wherein the small access node triggers the handover to the neighboring access node.

12. The system of claim 9, wherein the measurement event includes a determination at the end-user wireless device that a frequency band deployed by the donor access node has a stronger signal than a frequency band deployed by the small access node.

13. The system of claim 12, wherein the small access node triggers the handover to the frequency band deployed by the donor access node.

14. A relay node for relaying services to an end-user wireless device, the relay node comprising a processor for enabling the relay node to perform operations comprising:

receiving an indication of congestion in a radio resource control (RRC) message from a donor access node, wherein the indication of congestion comprises a dedicated bit in the RRC message and is based on a first resource usage of the donor access node meeting a first threshold;

in response to the indication, generating a measurement event for triggering a handover of an end-user wireless device communicatively coupled to the relay node;

transmitting the measurement event in a message to the end-user wireless device; and upon receiving a measurement of a neighbor node that exceeds a handover threshold, executing the handover of the end-user wireless device to the neighbor node.

15. The relay node of claim 14, further comprising a relay wireless interface for receiving the indication from the donor access node via a relay backhaul wireless link.

16. The relay node of claim 15, wherein the indication of congestion is further based on a second resource usage of the relay backhaul wireless link meeting a second threshold.

17. The relay node of claim 14, wherein the handover threshold is based on a signal quality of the neighbor node exceeding a signal quality of the relay node.

* * * * *